(12) United States Patent
Chow et al.

(10) Patent No.: US 12,192,162 B2
(45) Date of Patent: *Jan. 7, 2025

(54) MULTI-CHANNEL MESSAGING SYSTEM

(71) Applicant: The Toronto-Dominion Bank, Toronto (CA)

(72) Inventors: Arthur Carroll Chow, Markham (CA); Tae Gyun Moon, North York (CA); Sangeeta Mathew, Mississauga (CA); Darius Braziunas, Toronto (CA); Dino Paul D'Agostino, Richmond Hill (CA)

(73) Assignee: The Toronto-Dominion Bank, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,461

(22) Filed: Dec. 4, 2023

(65) Prior Publication Data
US 2024/0106789 A1 Mar. 28, 2024

Related U.S. Application Data

(63) Continuation of application No. 17/177,557, filed on Feb. 17, 2021, now Pat. No. 11,876,772.

(51) Int. Cl.
| | | |
|---|---|---|
| *G06F 15/16* | (2006.01) | |
| *H04L 51/226* | (2022.01) | |
| *H04L 51/56* | (2022.01) | |
| *H04L 51/58* | (2022.01) | |
| *H04W 4/12* | (2009.01) | |

(52) U.S. Cl.
CPC .......... *H04L 51/56* (2022.05); *H04L 51/226* (2022.05); *H04L 51/58* (2022.05); *H04W 4/12* (2013.01)

(58) Field of Classification Search
CPC ......... H04L 51/36; H04L 51/26; H04L 51/38; H04W 4/12
USPC ......................................................... 709/206
See application file for complete search history.

(56) References Cited

U.S. PATENT DOCUMENTS

| | | |
|---|---|---|
| 8,880,627 B2 | 11/2014 | Davenport |
| 9,560,001 B1 | 1/2017 | Collins |
| 9,948,592 B1 | 4/2018 | Collins |
| 9,979,680 B2 | 5/2018 | Chen et al. |
| 10,143,421 B2 | 12/2018 | Weast et al. |
| 10,270,728 B1 | 4/2019 | Collins |
| 10,511,564 B2 | 12/2019 | Govande |
| 10,659,418 B1 | 5/2020 | Collins |

(Continued)

*Primary Examiner* — Alicia Baturay
(74) *Attorney, Agent, or Firm* — Rowand LLP

(57) ABSTRACT

A computer-implemented method is disclosed. The method includes: detecting a trigger condition associated with a data record based on monitoring data record operations in connection with the data record; in response to detecting the trigger condition, generating a first message object for the data record, the first message object being associated with at least one compatible access channel; storing the first message object in a memory, the first message object being stored in association with a set of one or more message objects for the data record, wherein the first set defines an order for the one or more message objects; detecting a data record operation via a first access channel; retrieving, from the memory, at least one message object of the set that is associated with the first access channel; and causing the at least one message object to be delivered via the first access channel.

20 Claims, 7 Drawing Sheets

(56) References Cited

U.S. PATENT DOCUMENTS

| | | |
|---|---|---|
| 11,042,931 B2 | 6/2021 | Kade |
| 11,044,167 B2 | 6/2021 | Kade |
| 11,062,389 B2 | 7/2021 | Sarir |
| 11,086,675 B2 | 8/2021 | Kade |
| 11,153,665 B2 | 10/2021 | Beck |
| 11,157,558 B2 | 10/2021 | Beck |
| 11,275,842 B2 | 3/2022 | Dunjic |
| 11,343,239 B2 | 5/2022 | Dunjic |
| 11,379,804 B2 | 7/2022 | Kade |
| 11,388,063 B2 * | 7/2022 | Kade ................ G06Q 10/0631 |
| 11,393,020 B2 * | 7/2022 | Mathew ................ G06N 20/00 |
| 11,411,893 B2 * | 8/2022 | Kharshak ................ H04L 63/08 |
| 11,431,663 B2 | 8/2022 | Zhang |
| 11,876,772 B2 * | 1/2024 | Chow ................ H04L 51/56 |
| 2014/0164951 A1 | 6/2014 | Gupta |
| 2017/0099592 A1 | 4/2017 | Loeb et al. |
| 2018/0006989 A1 | 1/2018 | Dotan-Cohen et al. |
| 2020/0008171 A1 | 1/2020 | Jagannathan et al. |

\* cited by examiner

MULTI-CHANNEL MESSAGING SYSTEM

CROSS-REFERENCE TO RELATED APPLICATIONS

The present application is a continuation of U.S. patent application Ser. No. 17/177,557 entitled "MULTI-CHANNEL MESSAGING SYSTEM", filed Feb. 17, 2021, the contents of which are hereby incorporated by reference.

TECHNICAL FIELD

The present disclosure relates to network communications and, in particular, to methods for multi-channel messaging in a networked environment.

BACKGROUND

As smart devices continue to evolve, the number of ways of interfacing with information systems has significantly increased. From mobile devices to smart home appliances, various different technologies (or "channels") are used to connect and exchange data with other devices and systems, for example, over the Internet. In particular, a client entity may use a plurality of devices (and more generally, channels) to access information systems storing data that is associated with the client. It is desirable to provide timely and consistent delivery of data to client entities across multiple channels for communication.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
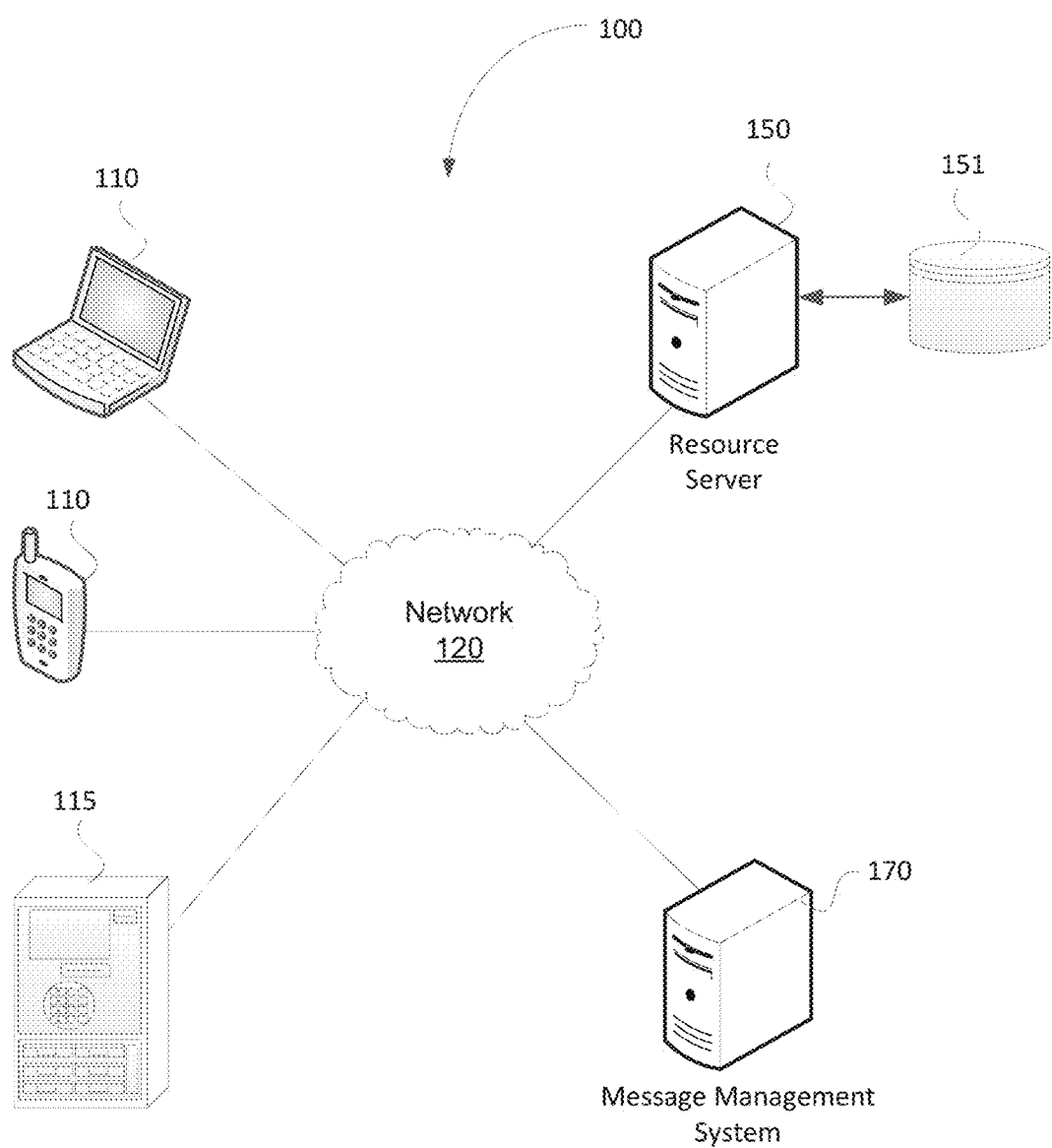
FIG. 1 is a schematic diagram illustrating an operating environment of an example embodiment.

In an aspect, a computing system is disclosed. The computing system includes a processor, a communications module coupled to the processor, and a memory coupled to the processor. The memory stores instructions that, when executed, configure the processor to: detect a trigger condition associated with a data record based on monitoring data record operations in connection with the data record; in response to detecting the trigger condition, generate a first message object for the data record, the first message object being associated with at least one compatible access channel and one or more defined rules for evaluating the first message object prior to delivery of the first message object to a recipient entity; store the first message object in the memory, the first message object being stored in association with a first set of one or more message objects for the data record, wherein the first set defines an order for the one or more message objects; detect a data record operation via a first access channel; retrieve, from the memory, at least one message object of the first set that is associated with the first access channel; and cause the at least one message object to be delivered to the recipient entity via the first access channel.

In some implementations, the order may define, for each of the one or more message objects of the first set, a delivery priority associated with the message object.

In some implementations, the first message object may include tag data identifying the at least one compatible access channel and the one or more defined rules.

In some implementations, the tag data may identify at least one other message object that is related to the first message object, the at least one other message object being associated with an access channel different from that of the first message object.

In some implementations, the instructions, when executed, may further configure the processor to: detect that one of the message objects of the first set has been delivered to the recipient entity; identify related message objects based on tag data for the one of the message objects of the first set; and modify a delivery priority associated with each of the identified related message objects.

In some implementations, the tag data may identify at least one data field of the first message object for updating prior to delivery of the first message object to the recipient entity.

In some implementations, the instructions, when executed, may further configure to processor to: obtain first data associated with the data record; and update the at least one data field of the first message object based on the obtained first data.

In some implementations, the first message object may identify a user authentication state that is required for delivering the first message object to the recipient entity via the at least one access channel.

In some implementations, the data record may be associated with a resource account of the recipient entity and detecting the trigger condition may include monitoring account data associated with the resource account.

In some implementations, causing the at least one message object to be delivered to the recipient entity may include: evaluating the one or more defined rules associated with the at least one message object; and causing the at least one one message object to be delivered only if conditions associated with the one or more defined rules are determined to be satisfied.

In another aspect, a computer-implemented method is disclosed. The method includes: detecting a trigger condition associated with a data record based on monitoring data record operations in connection with the data record; in response to detecting the trigger condition, generating a first message object for the data record, the first message object being associated with at least one compatible access channel and one or more defined rules for evaluating the first message object prior to delivery of the first message object to a recipient entity; storing the first message object in a memory, the first message object being stored in association with a first set of one or more message objects for the data record, wherein the first set defines an order for the one or more message objects; detecting a data record operation via a first access channel; retrieving, from the memory, at least one message object of the first set that is associated with the first access channel; and causing the at least one message object to be delivered to the recipient entity via the first access channel.

In yet another aspect, a non-transitory computer readable storage medium is disclosed. The computer readable storage medium contains instructions thereon which, when executed by a processor, configure the processor to: detect a trigger condition associated with a data record based on monitoring data record operations in connection with the data record; in response to detecting the trigger condition, generate a first message object for the data record, the first message object being associated with at least one compatible access channel and one or more defined rules for evaluating the first message object prior to delivery of the first message object to a recipient entity; store the first message object in the memory, the first message object being stored in association with a first set of one or more message objects for the data record, wherein the first set defines an order for the one or more message objects; detect a data record operation via a first access channel; retrieve, from the memory, at least one message object of the first set that is associated with the first access channel; and cause the at least one message object to be delivered to the recipient entity via the first access channel.

Other example embodiments of the present disclosure will be apparent to those of ordinary skill in the art from a review of the following detailed descriptions in conjunction with the drawings.

In the present application, the term "message object" refers broadly to any data object that contains at least one target message. The target message that is associated with a message object may, for example, be a reminder, an alert, an announcement, an offer, or the like. In some cases, a message object may be a notification which may be a visual, audible, and/or haptic notification. A message object may be formatted for outputting in a particular medium, such as an electronic device or service. For example, a message object may be an instant message, a personal message (i.e., direct messages), a text message, an email, a pop-up window, a selectable user interface element, an in-app message (e.g., push notifications), a voice recording, or the like. Additionally, or alternatively, a message object may be a data object having a data field indicating a type of medium in which the message object is to be outputted. In particular, a message object may not be formatted for a specific device (or service, etc.). In such cases, the message object may represent an instruction for a device to output a specific target message. Upon receiving a message object, the device may generate a message form, based on the target message associated with the message object, that is suitable for outputting on the device.

In the present application, the term "channel" refers broadly to a means for transmission of data. In particular, a channel may be a vehicle of transmission of messages between sender and recipient entities. For example, a channel may be a device (e.g., smart home appliances, mobile phones, electronic terminals, etc.), a knowledge source (e.g., e-books, websites, etc.), software (e.g., mobile apps, web browser, etc.), a service (e.g., email), digital media, or the like. A client entity may communicate with remote computing systems via one or more channels. For example, a client entity may access or receive data that is stored remotely, for example, at a database or a server, via multiple different channels.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates an exemplary computing environment 100 consistent with certain disclosed embodiments. As shown in FIG. 1, the computing environment 100 may include client devices 110, data terminal equipment 115, a resource server 150, a database 151 associated with the resource server 150, a message management system 170, and a communications network 120 connecting one or more of the components of computing environment 100.

As illustrated, a resource server 150 (which may also be referred to as a server computing system) and client devices 110 communicate via the network 120. In at least some embodiments, the client device 110 may be a computing device. The client device 110 may take a variety of forms including, for example, a mobile communication device such as a smartphone, a tablet computer, a wearable computer (such as a head-mounted display or smartwatch), a laptop or desktop computer, or a computing device of another type. The client device 110 may be associated with a client entity (e.g., an individual, an organization, etc.) having resources that are managed by or via the resource server 150. For example, the resource server 150 may be a financial institution server and the client entity may be a customer of a financial institution operating the financial institution server. The client device 110 may store software instructions that cause the client device 110 to establish communications with the resource server 150.

The resource server 150 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 150 may be coupled to a database 151, which may be provided in secure storage. The secure storage may be provided internally within the resource server 150 or externally. The secure storage may, for example, be provided remotely from the resource server 150. For example, the secure storage may include one or more data centers. The data centers may, in some embodiments, store data with bank-grade security.

The database 151 may include data records for a plurality of accounts and at least some of the data records may define a quantity of resources associated with the client entity. For example, the client entity may be associated with an account having one or more data records in the database 151. The data records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated data record such as, for example, a bank balance.

In at least some embodiments, the database 151 may store various types of information in connection with customers of a business entity that administers the resource server 150. For example, the database 151 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs that are offered to the customers by the business entity. The financial account data may include, in some embodiments, portfolio data relating to portfolios of investments that are held by customers. A customer's portfolio data may include, for example, information identifying actual positions held by the customer in various securities, information identifying a "virtual" portfolio composed of simulated positions held by the customer in various securities, and "watch lists" specifying various securities that are monitored by the customer.

The business entity associated with the resource server 150 may provide services that are accessible to the client entity. For example, the business entity may provide account management services, financial transaction services, and investment management services for the client entity. In at least some embodiments, the resource server 150 may be configured to provide a user interface that allows client devices 110 to access the services offered by the business entity. By way of example, the resource server 150 may be configured to provide a website or web-based portal which can be accessed via the client devices 110. The website (or portal) may include web content corresponding to various services offered by the business entity, and the resource server 150 may provide the web content for display on the client devices 110. As another example, the resource server 150 may be associated with software that can be installed and/or run on the client devices 110. The resource server 150 may, for example, implement the server-side backend of a mobile application (e.g., a mobile banking application) that provides users access to services offered by the business entity.

The computing environment 100 also includes one or more data terminal equipment 115. The data terminal equipment 115 is an end instrument that allows users to communicate. The data terminal equipment 115 may be, for example, a point-of-sale (POS) terminal, an automated teller machine (ATM), a barcode reader, an operator terminal, or the like. The data terminal equipment 115 may provide a user interface for accessing remote information systems. In particular, the data terminal equipment 115 may be used to access (i.e., view, edit, change, etc.) data that is stored at a remote computing system, such as a server computer. Additionally, or alternatively, the data terminal equipment 115 may be used to generate requests for transmitting to a remote service/system, such as a financial institution server, a payment processor, etc. For example, requests to transfer resources, process payments, verify information, or the like. may be initiated using the data terminal equipment 115.

A message management system 170 is provided in the computing environment 100. The message management system 170 provides services for managing messages that are transmitted between devices and systems of the computing environment 100. In particular, the message management system 170 may be configured to generate, send, receive, convert, and store messages (and more generally, message objects). The message management system 170 may handle message-related services on behalf of one or more computing systems that are communicably connected to the message management system 170. For example, one or more remote computing systems may request the message management system 170 to perform various message-related actions (e.g., message generation and transmission).

In some embodiments, the message management system 170 may be implemented by a computing system that manages and/or has access to user accounts. For example, a computing system that manages resource accounts, such as the resource server 150, may implement the message management system 170. In particular, the features and functions of the message management system 170 may be provided by a resource server. The resource server may offer services relating to management of messages in connection with user accounts that are managed by the resource server. While FIG. 1 illustrates the resource server 150 and the message management system 170 as being conceptually distinct, in some embodiments, they may be represented as the same computing system.

The message management system 170 may generate messages for transmission. In some embodiments, messages may be generated based on automated analysis of input data for the message management system 170. The input data may be data obtained from one or more remote computing systems. For example, the message management system 170 may be configured to generate messages based on automated analysis of user account data that is obtained from account management servers. In particular, the message management system 170 may access account data for specific users and algorithmically generate messages for presenting to the users based on their account data.

The client devices 110, the data terminal equipment 115, the resource server 150, and the message management system 170 may be in geographically disparate locations. Put differently, the client devices 110 may be remote from one or more of the data terminal equipment 115, the resource server 150, and the message management system 170. As described above, the client devices 110, the data terminal equipment 115, the resource server 150, and the message management system 170 may be computing systems.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

Figure 2A:
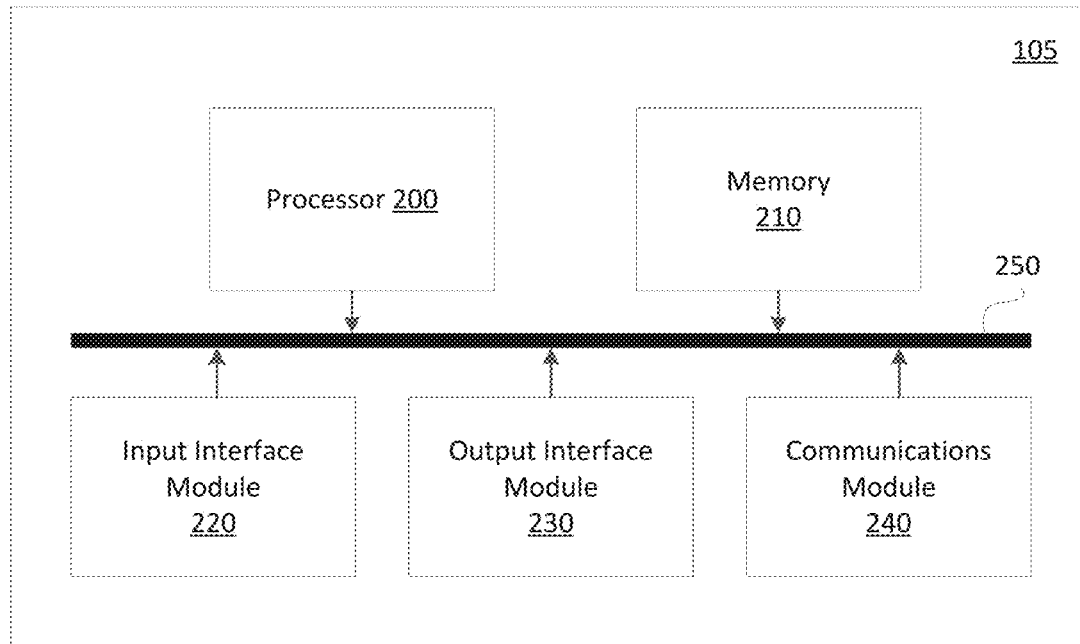
FIG. 2A is a high-level schematic diagram of an example computing device.

FIG. 2A is a high-level operation diagram of an example computing device 105. In some embodiments, the example computing device 105 may be exemplary of one or more of the client devices 110, the data terminal equipment 115, the resource server 150, and the message management system 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors, or the like.

The memory 210 allows data to be stored and retrieved. The memory 210 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include a touchscreen input, keyboard, trackball, or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
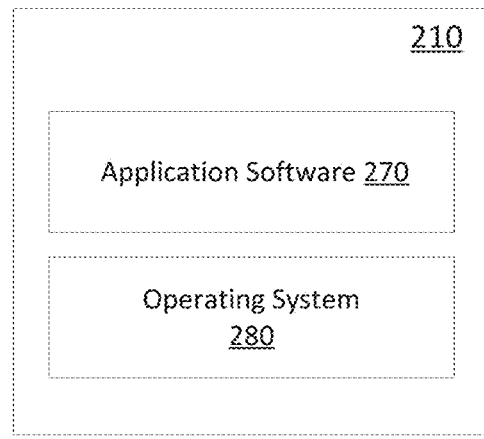
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google Android™, Linux™, Microsoft Windows™, or the like.

The application software 270 adapts the example computing device 105, in combination with the operating system 280, to operate as a device performing particular functions. In some embodiments, the application software 270 may include a resource management application. The resource management application may, for example, be a personal banking application that enables users to perform various actions for managing their bank accounts using a personal computing device (e.g., laptop, mobile phone, etc.).

Figure 3:
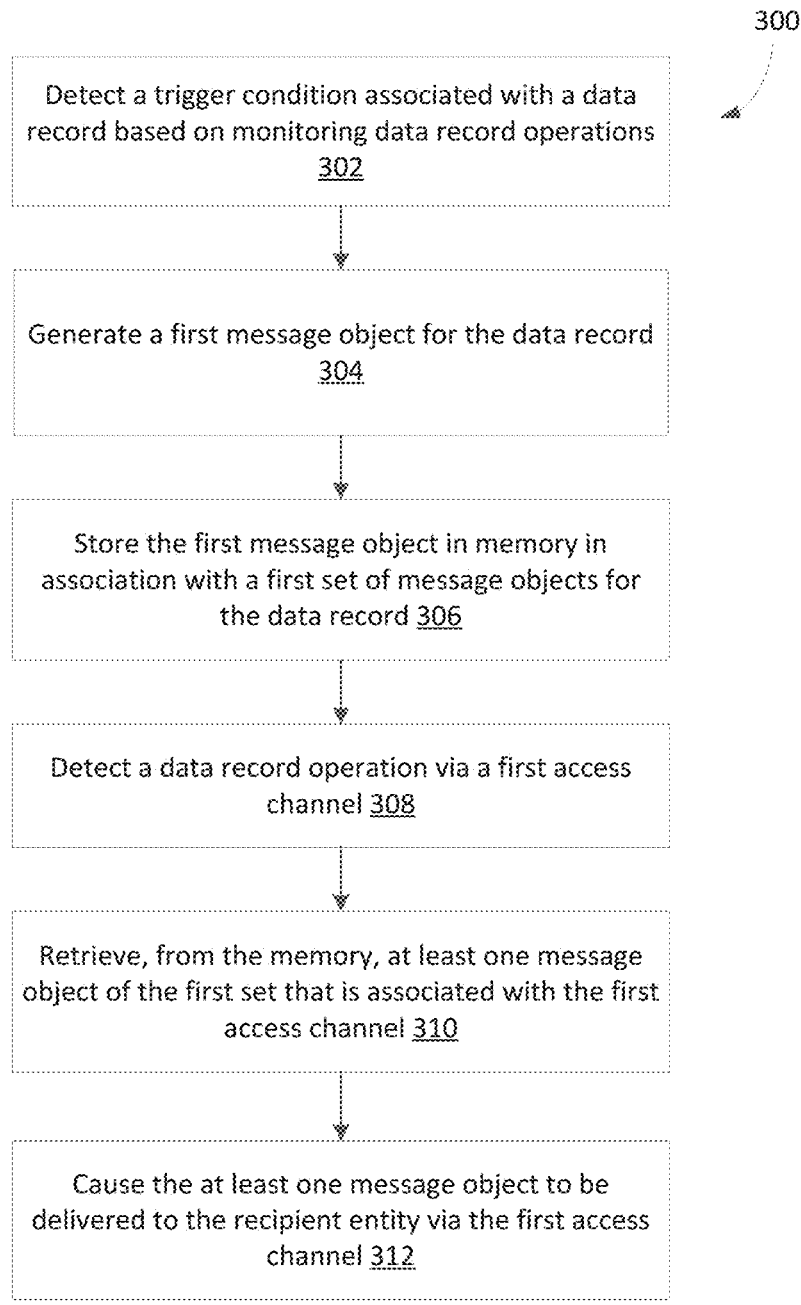
FIG. 3 shows, in flowchart form, an example method for delivering message objects to a recipient entity across multiple channels.

Reference is made to FIG. 3, which shows, in flowchart form, an example method 300 for delivering message objects to a recipient entity across multiple channels. The operations of method 300 may be performed by one or more processors of a computing system such as, for example, the processor 200 (FIG. 2A) of a suitably configured instance of the example computing device 105 (FIG. 2A). In at least some embodiments, the method 300 may be implemented by a server (such as the message management system 170 of FIG. 1) that is configured to handle message-related services for one or more computing systems. As a specific and non-limiting example, a server that manages or has access to data records associated with a plurality of user accounts may implement the method 300 for processing messages in connection with the user accounts.

A message management system monitors account activity for one or more user accounts. More particularly, the message management system monitors data record operations for data records associated with user accounts. The user accounts may, in at least some embodiments, be resource accounts storing (or defining) certain quantities of resources across one or more data records. A data record operation may be an operation for creating, accessing, reviewing, modifying, or deleting one or more data records. Examples of data record operations may include user-initiated changes to account or data record settings, transfers of certain quantities of resources, requests for certain quantities of resources, transactions (e.g., credit/debit transactions) in connection with resources of the account or data record, and the like. The message management system may be configured to directly monitor data record operations for data records associated with the user accounts, or obtain data record operations data from another system, such as an account management server. For example, the message management system may request to obtain, from an account management server, account data for one or more resource accounts, such as account balance and historical transactions data.

In operation 302, the message management system detects a trigger condition associated with a data record based on the monitoring of data record operations. In some embodiments, a trigger condition may be detected in real-time, for example, based on continuous monitoring. In particular, a data record operation in connection with a specific data record and a trigger condition associated with the data record may be detected concurrently, or substantially concurrently, by the message management system. For example, the message management system may determine that a detected data record operation causes or results in a defined trigger condition being satisfied.

In some embodiments, a trigger condition may be detected based on automated analysis of account data associated with the user accounts. By way of example, the message management system may identify, based on analysis of historical transactions data, one or more patterns of data record operations (e.g., recurring transactions) in connection with a particular data record. A trigger condition may be detected if the message management system determines that certain historical data record operations for the data record represent an identifiable pattern.

Various different trigger conditions may be defined by the message management system. In some embodiments, the trigger conditions may relate to the type of data record operations. For example, a definition of a trigger condition may identify certain types of data record operations. If the message management system determines that a type of a detected data record operation is one of the identified operations associated with a trigger condition, the message management system may determine that the trigger condition is satisfied. Examples of operation types include, but are not limited to: resource transfers, requests for resources, credit transactions, debit transactions, activation and deactivation of data records, adding or modifying personal information associated with the data record, recurring operations, etc.

In some embodiments, the trigger conditions may relate to certain defined rules in connection with data record operations. By way of example, a definition of a trigger condition may identify a type of data record operation and one or more rules (e.g., thresholds, ranges, etc.) for evaluating the data record operations. If the message management system detects a data record operation of a type identified by a trigger condition, the message management system may determine whether the trigger condition is satisfied based on evaluating the defined rules associated with the trigger condition. For example, if an account balance associated with a data record exceeds or falls below a defined threshold as a result of a particular data record operation, the message management system may determine that a trigger condition is satisfied.

More generally, trigger conditions may be defined in terms of a combination of variables relating to account data for a user account. Account data may include, among others, data record operations history (e.g., historical transactions data), account balance, personalization and preference data, account status, user settings, and the like. In at least some embodiments, the definition of a trigger condition may specify an account data item, one or more variables (e.g., type, range, threshold, etc.) associated with the account data item, and rules concerning the one or more variables. A trigger condition may be detected if the message management system determines that the defined rules associated with the trigger condition are satisfied.

The defined trigger conditions for a data record and/or user account may be stored in memory that is accessible by the message management system. In particular, definitions of one or more trigger conditions may be stored in association with specific data records and/or user accounts.

In response to detecting a trigger condition, the message management system generates a first message object for the data record, in operation 304. The first message object is a data object containing a target message that relates to the data record. In addition to the target message, the first message object may indicate information relating to delivery of the first message object. The first message object is associated with at least one compatible access channel. In particular, the first message object may identify a channel for communication by which the first message object is to be delivered to an intended recipient. The channel may, for example, be a specific personal device (e.g., a mobile phone, a tablet computer, a laptop, smart speakers, etc.) or a data terminal equipment (e.g., ATM) that is used for accessing the data record. In some embodiments, the channel may be defined more granularly. For example, numerous different channels (e.g., a mobile app, web browser, etc.) associated with a single device may be used for accessing the data record.

The first message object is also associated with one or more defined rules for evaluating the first message object prior to delivery of the first message object to the intended recipient. As will be explained in greater detail below, the one or more defined rules may be evaluated at a specific point in time by the message management system to determine whether the first message object should be delivered to the intended recipient at that time.

In some embodiments, the first message object may include tag data that identifies the at least one compatible access channel and the one or more defined rules. The tag data for the first message object may indicate, at least, channel compatibility information (e.g., an indication of one or more compatible channels) and definitions of rules for evaluating the first data object prior to its delivery to a recipient.

In at least some embodiments, the first message object may be generated by the message management system for delivery to the intended recipient at a point in time that is later than the time of generation of the first message object. That is, the first message object may not be delivered to the intended recipient immediately after it is generated. Instead, the first message object may be delivered at a later opportunity for interaction with the intended recipient. The message management system may generate and automatically store the first message object such that it is ready for delivery (e.g., display) to the intended recipient at a future point in time. In particular, the first message object may be stored in memory at a first point in time and delivered to the intended recipient at a second point in time, later than the first point in time, when the intended recipient accesses the data record via the first access channel. By generating message objects in advance for eventual delivery to a recipient, message objects that are highly relevant to the recipient may be identified and delivered in real-time when interaction with the recipient is detected.

In operation 306, the message management system stores the first message object in memory. The first message object is stored in association with a set of one or more message objects for the data record. More specifically, the message management system may maintain a set of message objects that includes one or more message objects containing target messages for delivery to the intended recipient. The set of message objects may be stored in memory, and the first message object may be stored together with the message objects of the set.

The set of message objects may be maintained using any one of various suitable data structures. In at least some embodiments, the message objects of the set may be maintained in a queue associated with the data record. The message objects of the set may be arranged in a particular order in the queue. More generally, the set may be associated with a defined order for the one or more message objects.

The order may, for example, be an order of expected delivery of the message objects. For example, the order may define, for each of the one or more message objects of the set, a delivery priority associated with the message object. The message management system may deliver message objects of the first according to their assigned order (for example, in the queue).

As message objects are generated and stored in memory, the message management system continues to monitor data record operations associated with the data record. In particular, the message management system monitors access operations for accessing the data record and the associated channels of access. In operation 308, the message management system detects a data record operation via a first access channel. For example, the message management system may determine that a user has logged in to access the data record using a personal computing device or a data terminal equipment. An access operation may be detected when a user logs in (e.g., provides authentication credentials) to an account associated with the data record at an account management server. Other user actions, such as booting up or powering on of a device (e.g., smart speakers), input of data, navigation of a user interface, and the like, in connection with the data record may be identified as data record operations. The message management system may itself detect user actions associated with the data record or, alternatively, it may be notified of user actions by another computing system, such as an account management server.

In operation 310, the message management system retrieves, from the memory, at least one message object of the first set that is associated with the first access channel. The message management system selects one of the message objects of the first set and retrieves the selected message object from the memory. The selected message object is one that is associated with the first access channel. For example, the selected message object may be tagged with (or include tag data including) indication of the first access channel as a compatible channel. That is, the message management system selects a message object that can be delivered via the first access channel when user interaction (e.g., a data record operation) is detected on the first access channel. In this way, message objects that are generated based on automated analysis of the data record can be stored and subsequently delivered via a channel on which interaction by the intended recipient is detected by the message management system.

In operation 312, the message management system causes the at least one message object to be delivered to the recipient entity via the first access channel. In some embodiments, the at least one message object may be formatted for delivery (e.g., display, playback, etc.) on the first access channel by the message management system. The formatted message object may then be transmitted to a suitable device/system for the intended recipient to access the message object. The message object selected for delivery may take various formats such as a reminder, an alert, an offer (e.g., a product or service offer), and the like. Alternatively, the selected message object may be transmitted to a device/system as-is, and the formatting of the message object may be performed on the client side.

Figure 4:
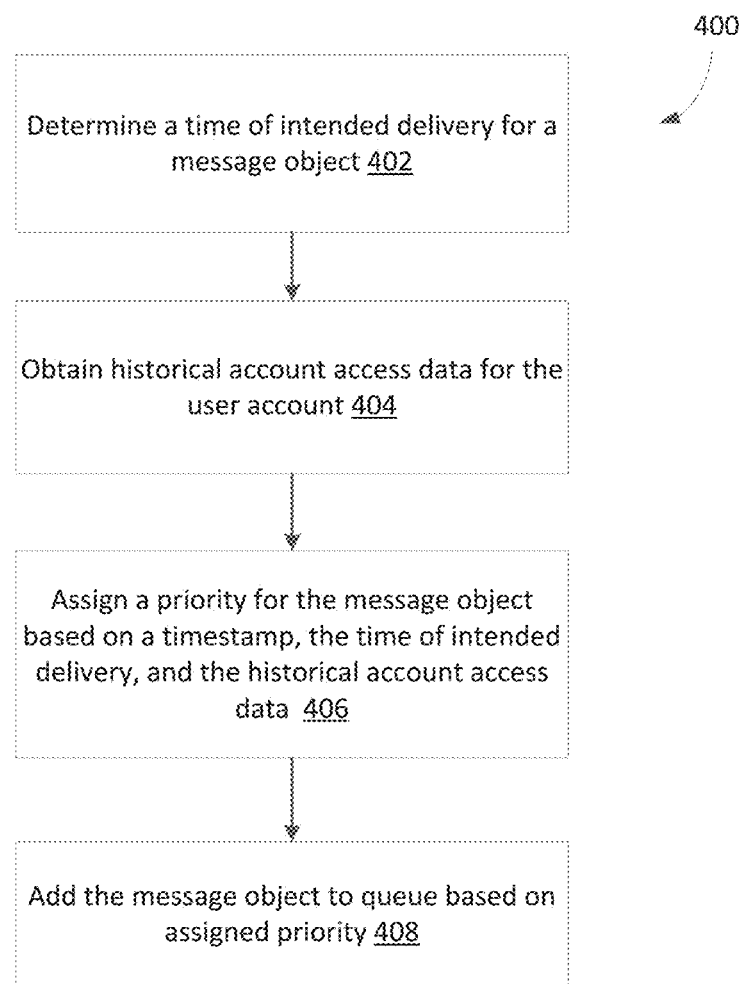
FIG. 4 shows, in flowchart form, an example method for managing a queue of message objects for transmission to a recipient entity.

Reference is made to FIG. 4, which shows, in flowchart form, an example method 400 for managing a queue of message objects for transmission to a recipient entity. The operations of method 400 may be performed by one or more processors of a computing system such as, for example, the processor 200 (FIG. 2A) of a suitably configured instance of the example computing device 105 (FIG. 2A). In at least some embodiments, the method 400 may be implemented by a server (such as the message management system 170 of FIG. 1) that handles message-related services for one or more computing systems.

The operations of method 400 may be performed as part of, or in addition to, method 300 of FIG. 3. In particular, the operations of method 400 may be included as part of a process for managing a queue of message objects that are generated by a message management system based on automated analysis of account data for a user account.

In operation 402, the message management system determines a time of intended delivery for a message object. When a message object is generated based on automated analysis of account data, it may include a data field for identifying when delivery of the message object to a recipient is intended. For example, the message object may indicate a specific date and time when the message object is to be delivered via a particular channel. Alternatively, the message object may define one or more rules (e.g., deliver at the next opportunity for user interaction, deliver before a certain defined event, etc.) concerning delivery of the message object to the intended recipient, and not a specific time.

In at least some embodiments, message objects may include timestamps that indicate when the message objects were generated by the message management system. In particular, each message object may have an associated timestamp comprising date and time information. In this way, the message objects that are stored (e.g., in a queue) for subsequent delivery to the intended recipient may be ordered chronologically based on timestamp information.

In operation 404, the message management system obtains historical account access data for the user account. The historical account access data includes data relating to access operations for one or more data records associated with the user account. For example, the historical account access data may indicate frequency, times, and type of access operation for each of the data records associated with the user account. The historical account access data may represent a user's interest level in connection with the data records. This interest level may, in turn, have a high correlation to the user's preference for receiving messages that relate to the respective data records. In particular, the historical account access data may affect which message objects are generated or added to the queue of message objects for the user account, and it may affect an ordering of message objects in the queue.

In operation 406, the message management system assigns, to each message object, a priority for the message object based on, at least, timestamp information, time of intended delivery, and the historical account access data associated with the message object. In some embodiments, the priority for message objects may be determined based on a weighted average of the factors of timestamp, intended delivery time, and historical account access data. That is, each of the factors may be assigned a weight representing the factor's importance in deriving the priority for a message object. The priority for a message object may be represented as, for example, a numerical value (i.e., a value within a range), a rank, or the like, such that direct comparison of the priorities of message objects can be conducted by the message management system.

In operation 408, the message objects that are generated by the message management system are added to the queue of message objects associated with the user account in accordance with the respective assigned priority. In particular, the order in which the message objects are arranged in the queue may be determined based on the respective priorities associated with the message objects. For example, a message object having a high priority (i.e., high relative priority value) may be arranged to be closer to the front of the queue than another message object having a lower priority. The order of the queue may be significant, as the selection of message objects for delivery to the intended recipient may proceed according to the queue order. Message objects may be selected, for example, on a first-in-first-out (FIFO) basis from the queue and processed.

In some embodiments, the message management system may remove or determine not to add to the queue those message objects having low priority. For example, a threshold priority level may be defined, and any message objects having a priority value that is lower than the threshold level may be removed from the queue (or not added to the queue at all).

Figure 5:
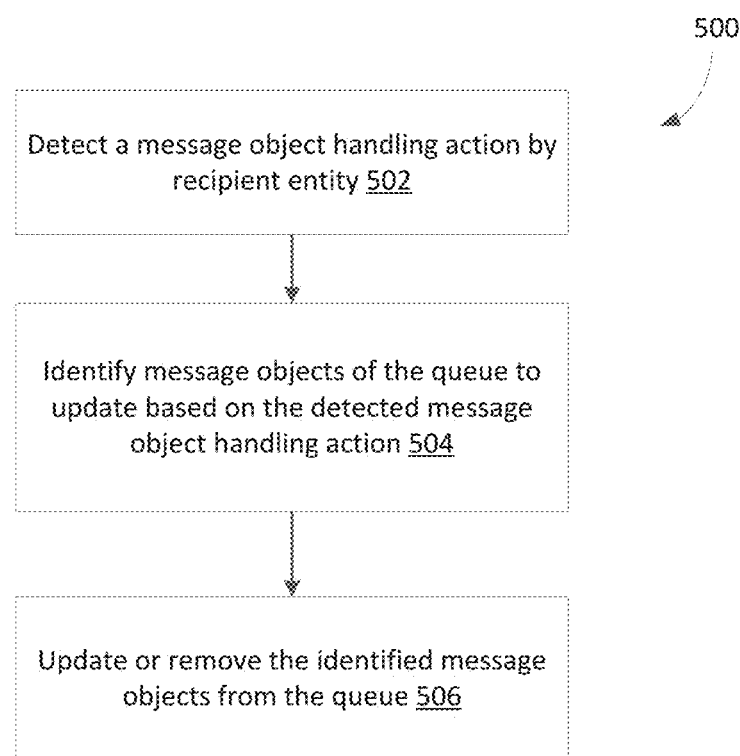
FIG. 5 shows, in flowchart form, an example method for managing a queue of message objects based on user interaction detected across multiple channels.

Reference is made to FIG. 5, which shows, in flowchart form, an example method 500 for managing a queue of message objects based on user interaction detected across multiple channels. The operations of method 500 may be performed by one or more processors of a computing system such as, for example, the processor 200 (FIG. 2A) of a suitably configured instance of the example computing device 105 (FIG. 2A). In at least some embodiments, the method 500 may be implemented by a server (such as the message management system 170 of FIG. 1) that handles message-related services for one or more computing systems.

The operations of method 500 may be performed as part of, or in addition to, method 300 of FIG. 3. In particular, the operations of method 500 may be included as part of a process for managing a queue of message objects that are generated by a message management system based on automated analysis of account data for a user account.

In operation 502, the message management system detects a message object handling action by a recipient entity. A message object handling action is an action that is performed by the recipient when presented with a message object. Typically, a recipient may dismiss message objects that are not of interest and interact with those message objects that are of interest. For example, if a message object, such as a notification, offer, announcement, alert, etc., is presented to a recipient, the recipient may perform an action to either dismiss the message object (e.g., closing a pop-up window, muting future alerts, or the like) or initiate a certain task (e.g., opening an app, generating a suitable response, etc.) in connection with the message object. A dismiss action with respect to a message object may be taken as an indicator that the recipient is not interested in the target message associated with the message object. On the other hand, a user action for engaging with a message object may be taken as an indicator that the recipient is interested in the target message associated with the message object.

A message object handling action by the intended recipient may thus have implications for the generation and/or management of message objects. In operation 504, the message management system identifies message objects of the queue to update based on the detected message object handling action. In at least some embodiments, the message management system may identify the message object ("first message object") that is directly affected by the message object handling action and determine one or more message objects of the queue that are related to the first message object. A message object may provide relationship data indicating its relationship to one or more other message objects. For example, a message object may include tag data identifying one or more related message objects.

Message objects may be related to each other if they contain the same or similar target message. For example, the message management system may generate multiple related message objects to prompt the intended recipient to take the same action, where the message objects may be formatted for delivery through different channels. When one of the related message objects is delivered to the intended recipient, the message management system may monitor the recipient's handling action in connection with the delivered message object. The handling action may inform how to manage the message objects in the queue that are related to the delivered message object.

In operation 506, the message management system updates or removes the identified message objects from the queue. For example, if the detected handling action is a dismiss action of a message object, the related message objects may be removed from the queue to avoid presenting the recipient with duplicate information. Alternatively, one or more of the related message objects may be updated based on the detected handling action. For example, if the recipient takes an action to indicate that they want to be presented with the target message again (e.g., a reminder), the time of intended delivery associated with one or more of the related message objects may be updated to reflect a time selected by the recipient. As another example, the delivery priorities for the related message objects may be updated. That is, the priorities assigned to each of the related message objects may be modified based on the detected handling action.

In some embodiments, delivery of a message object may itself cause the related message objects in the queue to be updated. For example, upon detecting that one of the message objects of the queue is delivered to the intended recipient, the message management system may identify the related messages (e.g., based on tag data for the message object) and modify a delivery priority associated with each of the identified related message objects. The priorities of the related message objects may, for example, be lowered to reflect that the target message has already been delivered once to the intended recipient.

Figure 6:
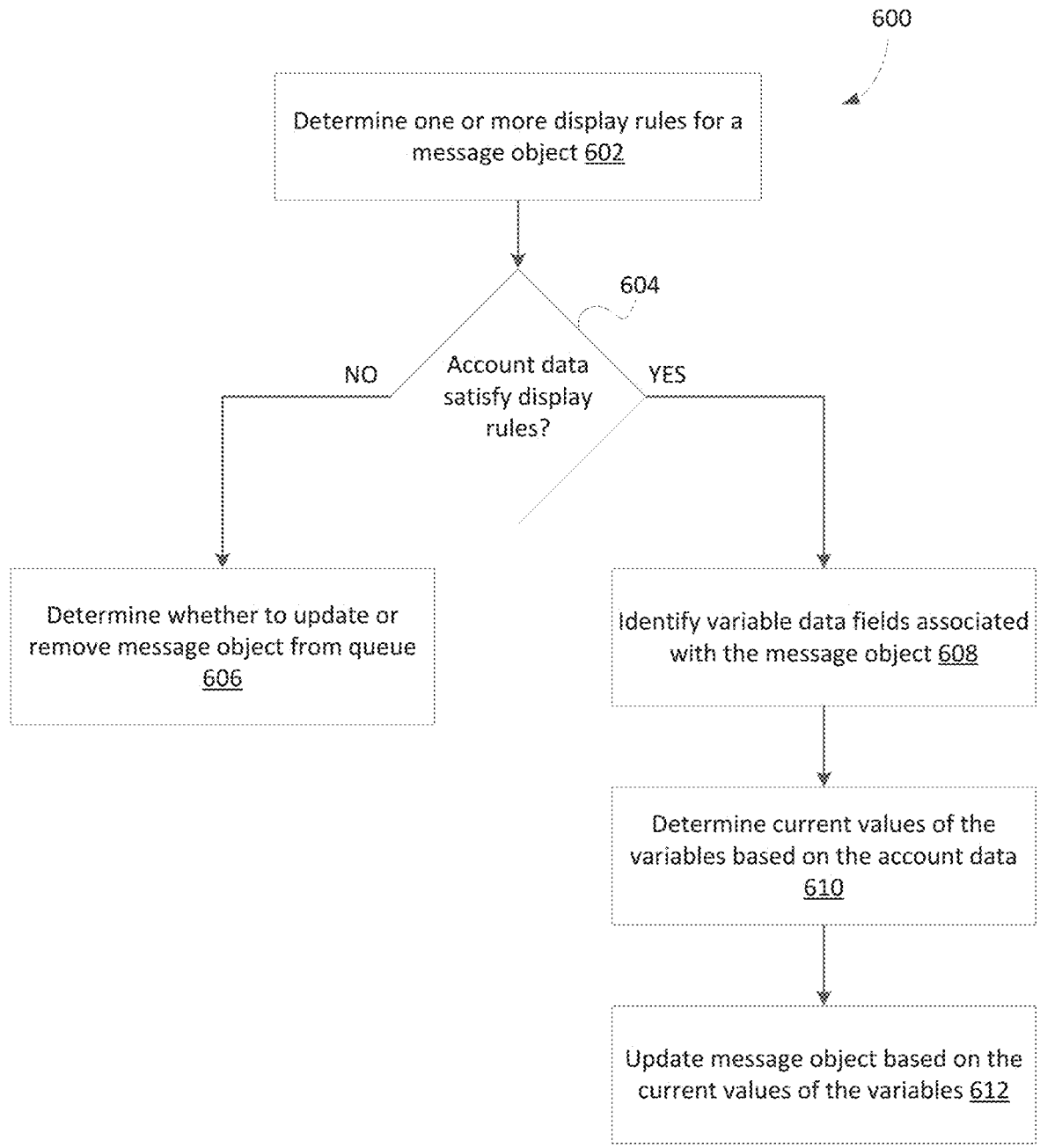
FIG. 6 shows, in flowchart form, an example method for configuring a message object for transmission to a recipient entity.

Reference is made to FIG. 6, which shows, in flowchart form, an example method 600 for configuring a message object for transmission to a recipient entity. The operations of method 600 may be performed by one or more processors of a computing system such as, for example, the processor 200 (FIG. 2A) of a suitably configured instance of the example computing device 105 (FIG. 2A). In at least some embodiments, the method 600 may be implemented by a server (such as the message management server 170 of FIG. 1) that is configured to handle message-related services for one or more computing systems.

The operations of method 600 may be performed as part of, or in addition to, method 300 of FIG. 3. In particular, the operations of method 600 may be included as part of a process for managing a queue of message objects that are generated by a message management system based on automated analysis of account data for a user account.

As described above, the message management system may generate message objects that are pre-populated with target messages. The message objects are generated some time prior to actual delivery to the intended recipient and stored in memory. For example, the message objects may be added to a queue associated with the user account. Certain data that is intended for presentation in the message object may change after the message object is added to the queue. In particular, change in data associated with a message object prior to delivery to the intended recipient may render the message object irrelevant or not suitable (e.g., information in the target message is incorrect).

In at least some embodiments, message objects may be evaluated against one or more display rules prior to delivery to the intended recipient. A display rule for a message object is a rule that is to be evaluated in real-time to determine whether the message object should be delivered, or whether another message object of the queue should be selected for delivery.

In operation 602, the message management system identifies display rules for a message object. In some embodiments, the display rules for a message object may be determined when the message object is first generated, and the display rules may be stored in association with the message object. For example, a message object may include tag data that includes definition of one or more display rules.

In operation 604, the message management system determines whether the account data for the user account satisfies the one or more display rules associated with the message object. In particular, the message management system may identify variables associated with the relevant display rules and obtain, in real-time, values of the identified variables based on the account data. The display rules may then be evaluated using real-time account data information, and the message management system can determine the suitability of delivering the message object to the intended recipient based on the evaluation.

If the display rules are determined to be satisfied, the message management system identifies variable data fields associated with the message object, in operation 608. The variable data fields may be data fields that are intentionally unfilled or that are subject to be changed in real-time prior to delivery of the message object. In some embodiments, the target message of a message object may include text that is tagged with a variable. For example, the text may include a variable identifier to indicate where a variable is being used. The variable informs the message management system that real-time account data should be obtained and used to replace the variable in the target message prior to delivery of the message object.

In operation 610, the message management system determines current values of the variables based on the account data, and in operation 612, the message management system updates the message object based on the current values of the variables. In particular, the current values of the variables may be used to replace information in the target message associated with the message object.

If, on the other hand, the display rules are determined to be not satisfied, the message management system determines whether to update or remove the message object from the queue, in operation 606. For example, a message object whose display rules are not satisfied at the time of expected delivery may be removed from the queue or modified to indicate that the message object is not currently relevant based on the account data for the user account (e.g., assigning a lower priority to the message object).

Figure 7:
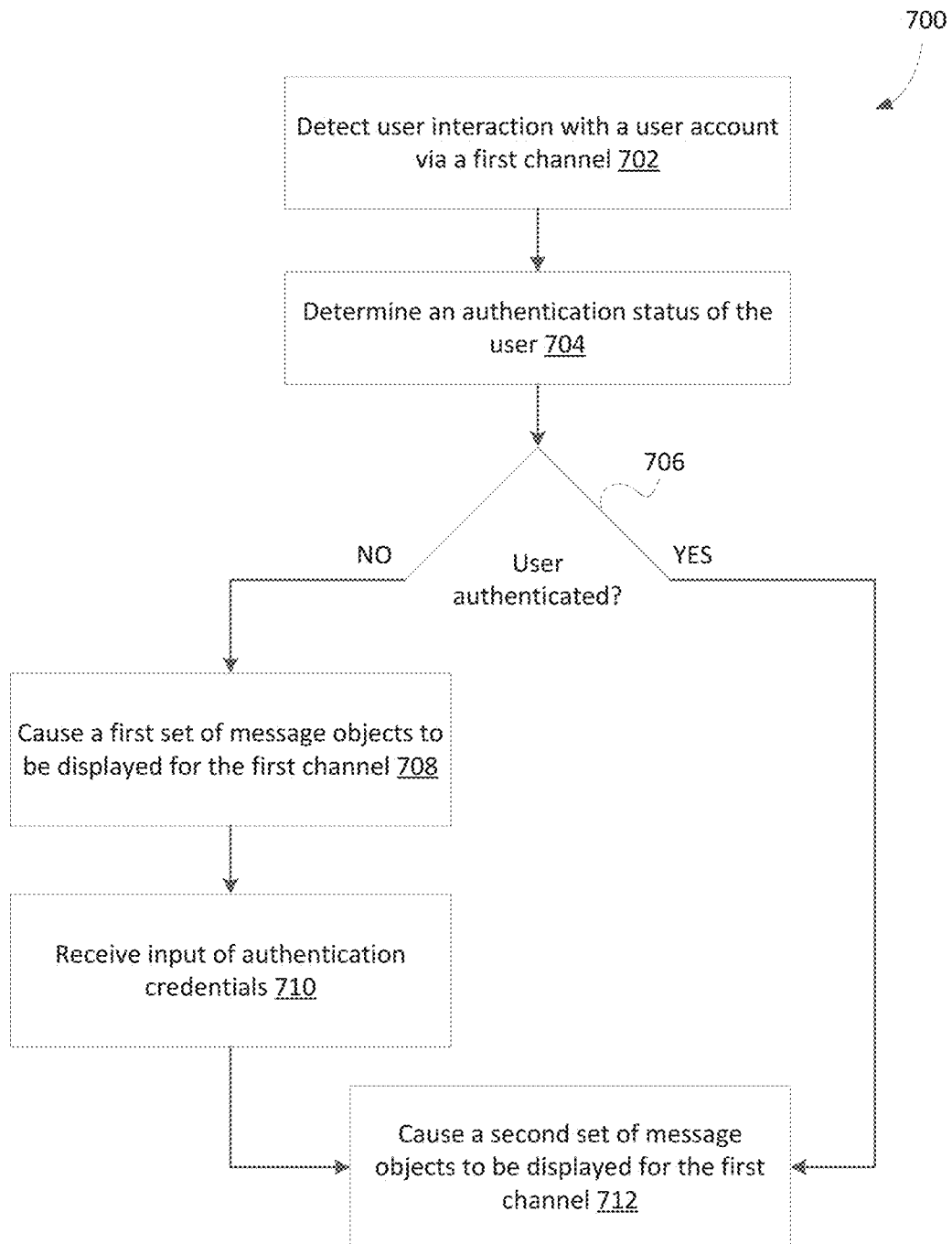
FIG. 7 shows, in flowchart form, an example method for controlling access to message objects.

Reference is made to FIG. 7, which shows, in flowchart form, an example method 700 for controlling access to message objects. The operations of method 700 may be performed by one or more processors of a computing system such as, for example, the processor 200 (FIG. 2A) of a suitably configured instance of the example computing device 105 (FIG. 2A). In at least some embodiments, the method 700 may be implemented by a server (such as the message management server 170 of FIG. 1) that is configured to handle message-related services for one or more computing systems.

The operations of method 700 may be performed as part of, or in addition to, method 300 of FIG. 3. In particular, the operations of method 700 may be included as part of a process for managing a queue of message objects that are generated by a message management system based on automated analysis of account data for a user account.

A message object may be tagged with data indicating an associated authentication status. More specifically, a message object may specify an authentication level for an intended recipient that is required to access the message object. The message object may be accessible only if the required authentication level can be confirmed for the intended recipient. For example, the message object may be delivered to the intended recipient via a channel if the required authentication state for the channel is confirmed.

In operation 702, the message management system detects user interaction with a user account via a first channel. The message management system determines an authentication status of the user, in operation 704. In particular, the authentication status of the user that initiated action on the first channel is determined. The authentication status may, for example, indicate a level of authentication of the user in connection with the user account. In some embodiments, the authentication status may also indicate a level of authentication that is required for a specific access channel. That is, the authentication required for accessing a message object may be, at least, two-tiered: authentication may be required with respect to the user account and, separately, with respect to the specific channel by which access (e.g., delivery) of the message object is provided.

In operation 706, the message management system determines whether the user is authenticated. If the user is determined to be not authenticated, the message management system causes a first set of message objects to be displayed for the first channel, in operation 708. The first set may include message objects that do not require authentication for access (e.g., message objects containing generic target message). In particular, the first set may include only those message objects that do not contain sensitive (e.g., personal, confidential, or the like) information about the user account.

In operation 710, the message management system receives input of authentication credentials. If the user successfully authenticates through input of credentials, the message management system causes a second set of message objects to be displayed for the first channel, in operation 712. The second set may include message objects that include sensitive information. In particular, each of the message objects of the second set may be tagged with data indicating that authentication is required for accessing the message object.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
one or more processors;
a communications module coupled to the one or more processors; and
a memory coupled to the one or more processors, the memory storing instructions that, when executed, configure the one or more processors to:
detect a trigger condition associated with a data record based on monitoring data record operations in connection with the data record;
in response to detecting the trigger condition, generate a first message object for the data record and a related message object, the first message object being associated with at least one compatible access channel and the related message object being associated with a second access channel different from the at least one compatible access channel associated with the first message object;
store the first message object and related message object in the memory, the first message object being stored in association with a set of one or more message objects for the data record;
detect a data record operation via a first access channel; and
select the first message object from the set based on a real-time determination that the at least one compatible access channel includes the first access channel via which the data record operation is detected; and
cause the first message object to be delivered via the first access channel.

2. The computing system of claim 1, wherein the instructions, when executed, further configure the one or more processors to select the first message object in response to detection of the data record operation via the first access channel.

3. The computing system of claim 1, wherein the data record operation is a resource account data record operation.

4. The computing system of claim 1, wherein the data record is associated with a resource account of a recipient entity and the data record defines a quantity of stored value resources that are associated with the recipient entity.

5. The computing system of claim 1, wherein the related message object includes a same or similar target message as the first message object.

6. The computing system of claim 1, wherein the first message object is associated with one or more defined rules for evaluating the first message object prior to delivery of the first message object.

7. The computing system of claim 1, wherein the set defines an order for the one or more message objects.

8. The computing system of claim 1, wherein the first message object includes tag data identifying the related message object.

9. The computing system of claim 1, wherein the instructions, when executed, further configure the one or more processors to:
detect that one of the message objects of the set has been delivered;
identify the related message object based on tag data for the one of the message objects of the set; and
modify a delivery priority associated with the related message object.

10. The computing system of claim 1, wherein the first message object identifies a user authentication state that is required for delivering the first message object via the at least one compatible access channel.

11. A computer-implemented method, comprising:
detecting a trigger condition associated with a data record based on monitoring data record operations in connection with the data record;
in response to detecting the trigger condition, generating a first message object for the data record and a related message object, the first message object being associated with at least one compatible access channel and the related message object being associated with a second access channel different from the at least one compatible access channel associated with the first message object;
storing the first message object and related message object in a memory, the first message object being stored in association with a set of one or more message objects for the data record;
detecting a data record operation via a first access channel; and
selecting the first message object from the set based on a real-time determination that the at least one compatible access channel includes the first access channel via which the data record operation is detected; and
causing the first message object to be delivered via the first access channel.

12. The method of claim 11, wherein selecting the first message object occurs in response to detecting the data record operation via the first access channel.

13. The method of claim 11, wherein the data record operation is a resource account data record operation.

14. The method of claim 11, wherein the data record is associated with a resource account of a recipient entity and the data record defines a quantity of stored value resources that are associated with the recipient entity.

15. The method of claim 11, wherein the related message object includes a same or similar target message as the first message object.

16. The method of claim 11, wherein the first message object is associated with one or more defined rules for evaluating the first message object prior to delivery of the first message object.

17. The method of claim 11, wherein the set defines an order for the one or more message objects.

18. The method of claim 11, wherein the first message object includes tag data identifying the related message object.

19. The method of claim 11, further comprising:
detecting that one of the message objects of the set has been delivered;
identifying the related message object based on tag data for the one of the message objects of the set; and
modifying a delivery priority associated with the related message object.

20. A non-transitory computer readable storage medium is comprising processor-executable instructions which, when executed, configure one or more processors to:
detect a trigger condition associated with a data record based on monitoring data record operations in connection with the data record;
in response to detecting the trigger condition, generate a first message object for the data record and a related message object, the first message object being associated with at least one compatible access channel and the related message object being associated with a second access channel different from the at least one compatible access channel associated with the first message object;

store the first message object and related message object in a memory, the first message object being stored in association with a set of one or more message objects for the data record;

detect a data record operation via a first access channel; and select the first message object from the set based on a real-time determination that the at least one compatible access channel includes the first access channel via which the data record operation is detected; and cause the first message object to be delivered to via the first access channel.

* * * * *